United States Patent [19]

Warner

[11] Patent Number: 4,872,537
[45] Date of Patent: Oct. 10, 1989

[54] ADJUSTABLE DAMPER MEANS FOR SHOCK ABSORBER

[76] Inventor: Brian Warner, 84 Eastbourne, Beaconsfield, Quebec, Canada, H9W 5G9

[21] Appl. No.: 203,315

[22] Filed: Jun. 6, 1988

[51] Int. Cl.$^4$ ............ F16F 5/00; F16F 9/34; F16F 9/44; F16F 15/16
[52] U.S. Cl. .................... 188/319; 188/280; 188/282; 188/322.15; 188/322.14; 267/64.26; 137/856
[58] Field of Search ............ 267/113, 64.15, 64.26; 188/280, 281, 282, 322.15, 322.13, 3.22.14, 299, 311, 314, 318, 319; 137/856, 493.8

[56] References Cited

U.S. PATENT DOCUMENTS

| | | | |
|---|---|---|---|
| 4,010,829 | 3/1977 | Naito et al. | 188/322.14 X |
| 4,153,237 | 5/1979 | Supalla | 267/64.15 |
| 4,159,106 | 6/1979 | Nyman . | |
| 4,311,302 | 1/1982 | Heyer et al. | 267/64.26 X |
| 4,442,926 | 4/1984 | Muto . | |
| 4,542,768 | 9/1985 | Harris | 137/856 |
| 4,546,959 | 10/1985 | Tanno . | |
| 4,561,524 | 12/1985 | Mizumukai et al. | 188/319 |
| 4,635,765 | 1/1987 | Schmidt | 188/322.13 X |
| 4,706,787 | 11/1987 | Wössner . | |
| 4,720,085 | 1/1988 | Shinbori et al. | 267/64.26 X |
| 4,732,244 | 3/1988 | Verkuylen | 188/299 X |

FOREIGN PATENT DOCUMENTS

| | | | |
|---|---|---|---|
| 0207409 | 1/1987 | European Pat. Off. | 188/322.15 |
| 0636841 | 9/1936 | Fed. Rep. of Germany | 188/280 |
| 1086567 | 8/1960 | Fed. Rep. of Germany | 188/322.15 |
| 2180320 | 3/1987 | United Kingdom | 188/299 |

Primary Examiner—Andres Kashnikow
Assistant Examiner—Richard Potosnak
Attorney, Agent, or Firm—Chilton, Alix & Van Kirk

[57] ABSTRACT

A piston and cylinder arrangement, which includes a piston and piston rod assembly and which is filled with a damper-fluid, is attached to an auxiliary tank by a flow channel. A first restriction in the piston and piston rod assembly substantially controls the low velocity flow of the damper fluid during extension strokes and a second restriction in the piston and piston rod assembly substantially controls high velocity flow of the damper fluid during the extension strokes. A third restriction in the flow channel substantially controls the low velocity flow of the damper-fluid during compression strokes, and a fourth restriction in the flow channel substantially controls the high velocity flow of the damper-fluid during the compression strokes. Substantially unrestricted flow of the damper-fluid through the piston and piston rod assembly is permitted during the compression strokes, and substantially unrestricted flow of the damper-fluid through the flow channel is permitted during extension strokes.

Claims, 6 Drawing Sheets

ADJUSTABLE DAMPER MEANS FOR SHOCK ABSORBER

BACKGROUND OF INVENTION

1. Field of the Invention

The invention relates to a damper means for a shock absorber which damper means comprises a damper-fluid filled piston and cylinder arrangement, an auxiliary tank, and a flow channel between the two. More specifically, the invention relates to such a damper means including variable high damper-fluid flow speed restriction means and variable low damper-fluid flow speed restriction means in the flow channel, and a variable high damper-fluid flow speed restriction means and a variable low damper-fluid flow speed restriction means in the piston and cylinder arrangement.

2. Description of Prior Art

Known in the art are damper means comprising oil-filled or damper-fluid filled piston and cylinder arrangements with auxiliary tanks as illustrated in, for example, U.S. Pat. No. 4,546,959, Tanno, Oct. 15, 1985, U.S. Pat. No. 4,706,787, Wossner, Nov. 17, 1987, and U.S. Pat. No. 4,159,106, Nyman, June 26, 1979. The Tanno patent teaches the use of a variable restriction in the flow channel between the piston and cylinder arrangement and the auxiliary tank, but it is a single variable restriction and therefore has a limited range of adjustment. In addition, Tanno teaches a fixed restriction and a possibly variable restriction associated with the piston and cylinder arrangement.

The Wossner patent also teaches a damper arrangement of the same general class. However, the variable restrictions in the piston and cylinder arrangement of Wossner is disposed in serial arrangement, and Wossner does not teach any restrictions between the piston and cylinder arrangement and the auxiliary tank.

Nyman teaches a single variable restriction in the flow channel, and the possibility of a single variable restriction associated with the piston and cylinder arrangement.

U.S. Pat. No. 4,442,926, Muto, Apr. 17, 1984, also teaches a damper comprising a damperfluid filled piston and cylinder arrangement, and an auxiliary tank. Variable restrictions, for the compression and extension strokes, are included in the piston and cylinder arrangements.

The problems with the above available dampers, and others not identified herein, is that they have a limited range of adjustment and, typically, except for Tanno and Wossner, the adjustments cannot be made externally, so that they comprise in fact factory, rather than user, adjustments.

In addition, and especially in dampers as in the Tanno patent, there is a danger of cavitation, the so-called meter-out effect, behind the piston (on the rod side thereof) during the compression stroke.

SUMMARY OF INVENTION

It is therefore an object of the invention to provide a damper means for a shock absorber which overcomes the above-noted disadvantages.

It is a more specific object of the invention to provide an adjustable damper means with a wide range of adjustments which can be made externally.

It is a further object of the invention to provide a damper means which avoids cavitation.

In accordance with the invention there is provided an adjustable damper means for a shock absorber which comprises a piston and cylinder arrangement comprising a cylinder, and a piston and piston rod assembly slidably mounted in the cylinder and dividing the cylinder into a first chamber and a second chamber, the cylinder being filled with a damper-fluid. The damper means also includes an auxiliary tank, and a flow channel permits flow of the damper-fluid between the cylinder and the auxiliary tank. During the compression strokes of the piston and piston rod assembly, the volume of the first chamber is decreased and the volume of the second chamber is increased, and during the extension strokes of the piston and piston cylinder arrangement, the volume of the first chamber is increased and the volume of the second chamber is decreased. The damper means also includes a first restriction means associated with the piston and piston rod assembly and substantially controlling the low velocity flow of the damper-fluid during the extension strokes, and a second restriction means associated with the piston and piston rod assembly substantially controlling the high velocity flow of the damper-fluid during the extension strokes. A third restriction means in the flow channel substantially controls the low velocity flow of the damper-fluid during the compression strokes, and a fourth restriction means in the flow channel substantially controls the high velocity flow of the damper-fluid during the compression strokes.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
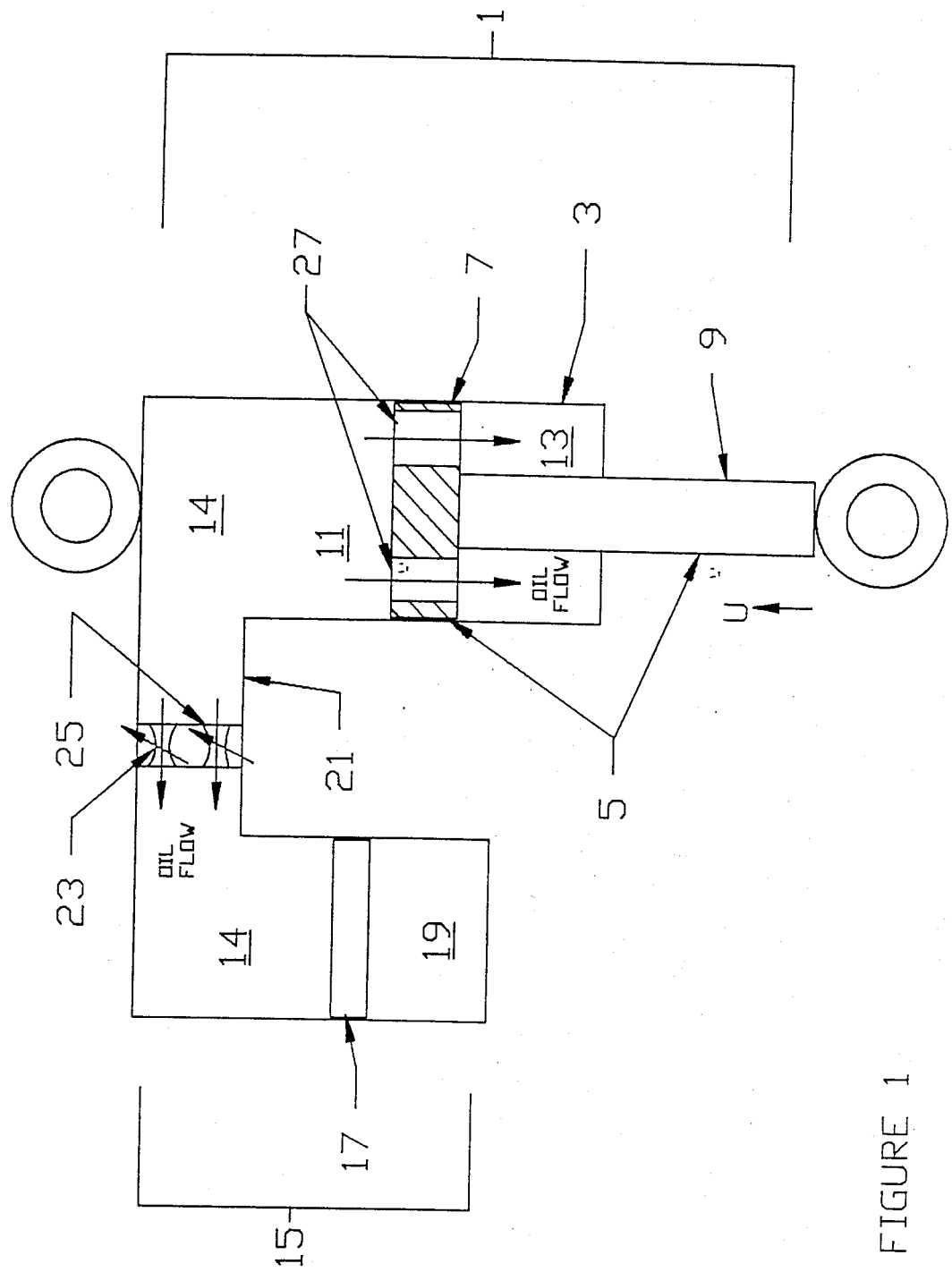
FIG. 1 is a schematic drawing of the damper means during the compression stroke.

Referring first to FIG. 1, the damper means consists of a piston and cylinder arrangement, illustrated generally at 1, and including a cylinder 3 and a piston and piston rod assembly 5. The piston and piston rod assembly 5 includes a piston head 7 and a piston rod 9. The piston head 7 divides the cylinder 3 into a first chamber 11 and a second chamber 13. The cylinder is filled with a damper-fluid, for example, oil, 14.

The damper means also includes an auxiliary tank 15 including a free floating piston 17. Disposed below the free floating piston is a low pressure gas such as nitrogen 19. The upper chamber of the auxiliary tank is also filled with the same damper-fluid 14 as the cylinder 3.

A flow channel 21 connects the cylinder to the auxiliary tank and permits the flow of the damper-fluid between the two. During the compression stroke, there is a variable low velocity restriction 23 and a variable high velocity restriction 25 in the flow channel. Restrictions 23 and 25 will be further described below.

Again, in the compression stroke, means 27 are provided in the piston and piston rod assembly 5 for permitting substantially unrestricted flow across the piston head from chamber 11 to chamber 13.

As will be clear, during the compression stroke, when the piston and piston rod assembly move in the direction of the arrow U, the volume of the upper chamber 11 is decreasing while the volume of the lower chamber 13 is increasing.

Because of the placement of the restrictions during the compression stroke, a vacuum will not form on the bottom of the piston head (the rod side of the piston head) as there is substantially unrestricted flow across the piston head. Thus, cavitation is avoided.

Figure 2:
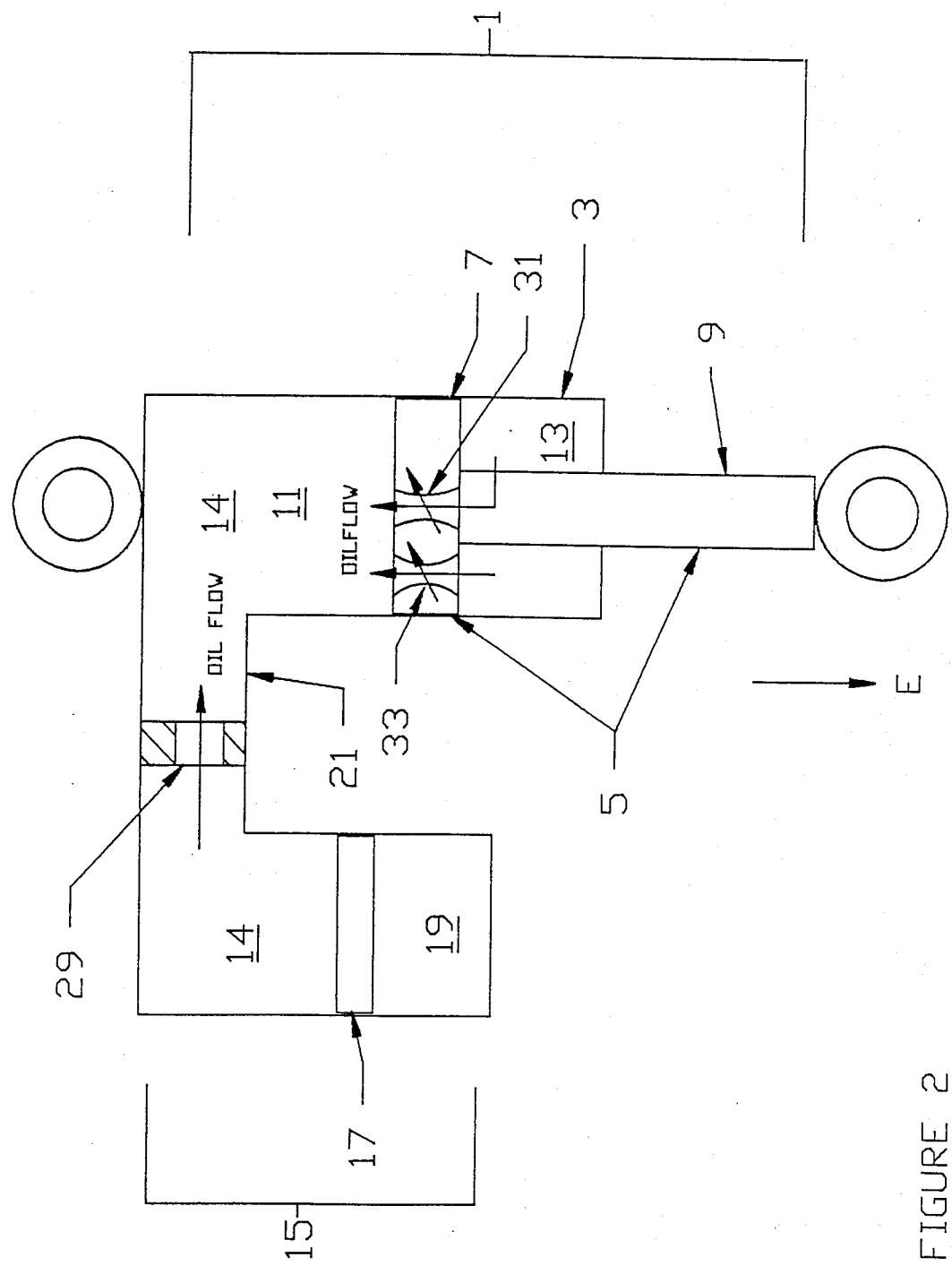
FIG. 2 is a schematic drawing of the damper means during the extension stroke.

Referring now to FIG. 2, wherein like numerals refer to like parts, it can be seen that during the extension stroke, when the piston and rod assembly move in the direction of the arrow E, means 29 are provided in flow channel 21 to permit substantially unrestricted flow through the flow channel. A variable low velocity restriction 31 is included in the piston head, and a variable high velocity restriction 33 is also included in the piston head. During the extension stroke, the oil in chamber 13 is at high pressure and the oil in chamber 11 is at low pressure.

Figure 3:
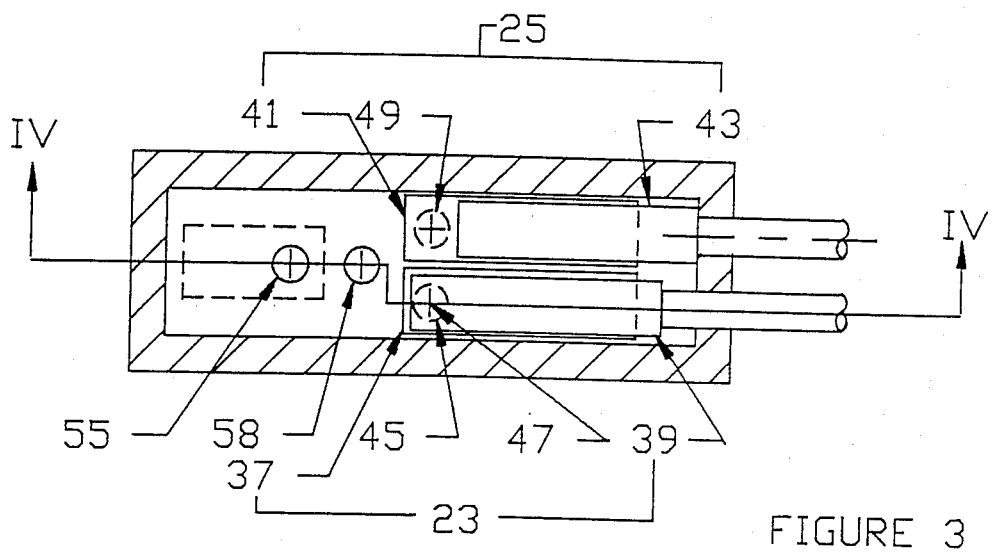
FIG. 3 illustrates the restriction means in the flow channel.
Figure 4:
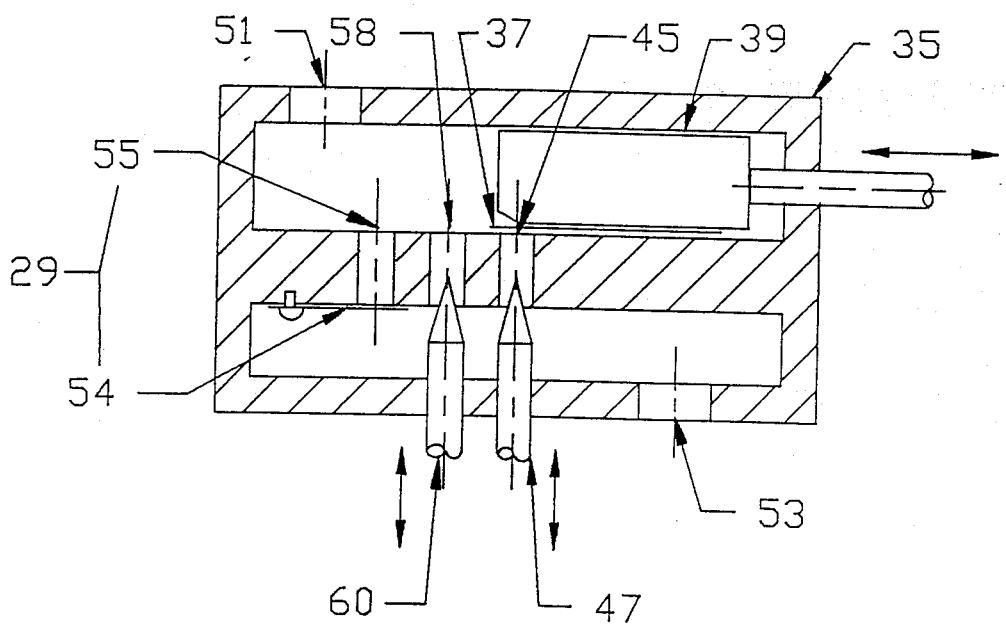
FIG. 4 is a section through IV—IV of FIG. 3.

Referring now to FIGS. 3 and 4, the restriction means in the flow channels are housed in an enclosure 35. As can be seen, the variable low velocity restriction 23 comprises a reed valve 37 and a slidable adjustment block 39. Orifice adjustment means 47 adjusts the size of the orifice 45.

The variable high velocity restriction 25 comprises a reed valve 41 and a slidable adjustment block 43. Reed valve 37 covers orifice 45 and an orifice adjustment means 47 adjusts the size of orifice 45. Reed valve 41 covers orifice 49.

Reed valve 37 is relatively flexible, and reed valve 41 is relatively rigid. During the low velocity flow, flexible reed valve 37 will be moved, but rigid reed valve 41 will be moved very little if at all. Accordingly, the flow rate is determined substantially by the movement of reed valve 37.

During high velocity flow, reed valve 37 will be substantially completely open so that the flow rate is controlled substantially by reed valve 41.

Figure 5:
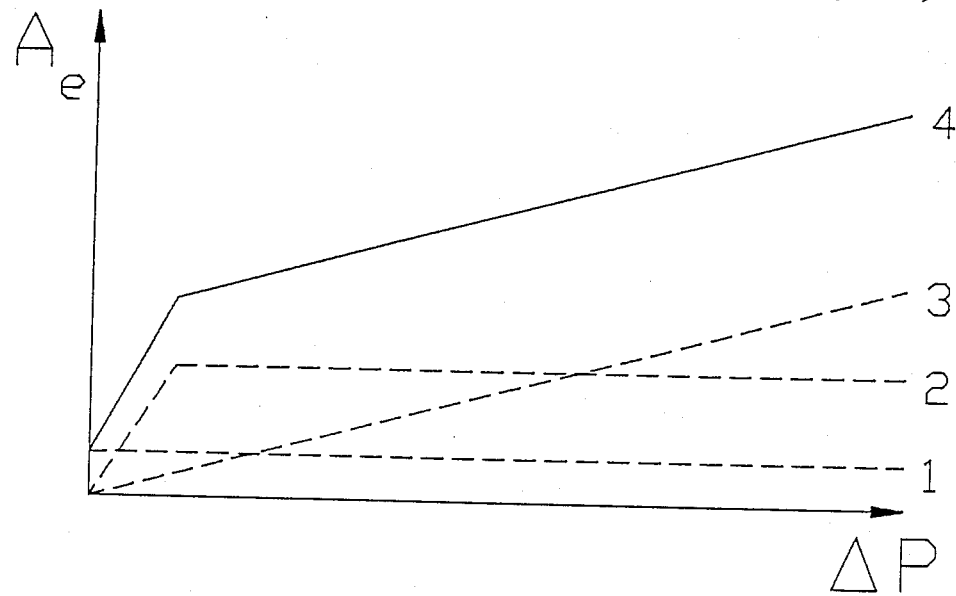
FIG. 5 is an effective area versus change in pressure graph of the restriction means of FIG. 3.

Referring now to FIG. 5, FIG. 5 illustrates the operation of the restriction means in the flow channel under different conditions. $A_e$ is the effective area, i.e., the effective area through which fluid can flow. $\Delta P$ is the pressure differential between the high and low pressure chambers.

Dotted line 1 illustrates the effect of the bleed orifice 58. If the bleed orifice is completely closed by needle adjuster 60, then dotted line 1 would lie on the 0 line of the $A_e$ axis. As the needle 60 is pulled out more and more from the orifice 58, then a greater effective area opens through the orifice 58 so that, even under 0 change in pressure, there will still be an effective open area through which fluid can flow.

Dotted line 2 shows the effect of more flexible reed valve 37. The straight horizontal part of dotted line 2 reflects the fact that there is a maximum effective area over the reed, i.e., when the reed is completely out of the way of its orifice, then increasing the pressure will not increase the effective area of the orifice. The maximum effective area is adjusted by needle valve 47 in much the same way that needle valve 60 affects the bleed orifice effective area.

Dotted line 3 illustrates the effect of rigid reed valve 41. As can be seen, it takes a relatively large increase in pressure to provide even a small increase in effective area.

Solid line 4 is a composite of the three dotted lines and shows the complete action of the restriction means in the flow channels. Briefly, at first, small increases in pressure will bring about large increases in effective area. After the break point, even a large increase in pressure will bring about only a small increase in effective area.

Figure 5A:
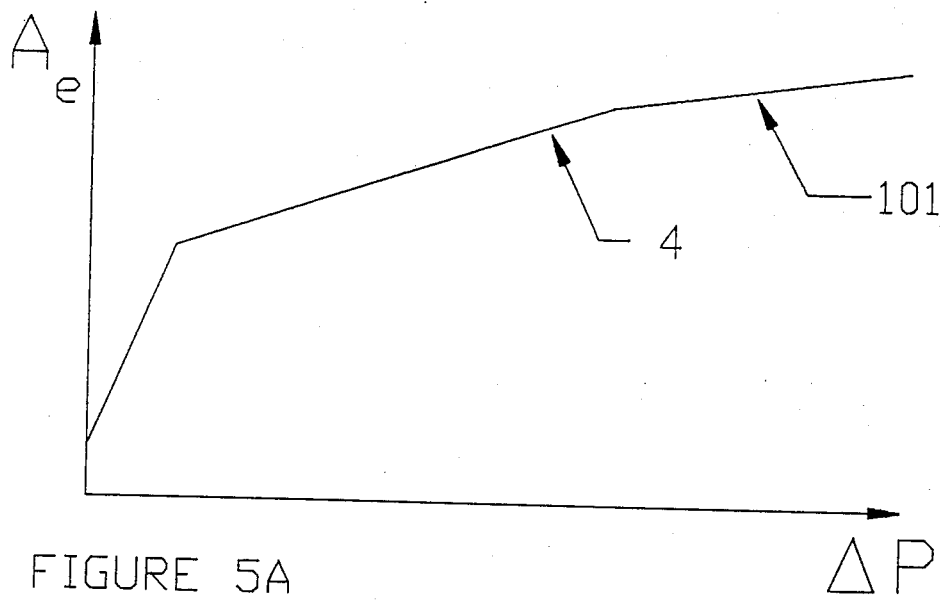
FIG. 5A is a composite of the several curves in FIG. 5.

To provide even greater control, a third reed valve would be supplied. The third reed valve would be even more rigid than rigid reed valve 41. The effect of the further reed valve would be as illustrated by line 101 in FIG. 5A. That is, it will take an even greater increase in pressure to bring about a small increase in effective area.

Returning to FIGS. 3 and 4, opening 51 in enclosure 35 is in communication with the auxiliary tank 15, while opening 53 in enclosure 35 is in communication with the cylinder 3.

The means 29 for permitting substantially unrestricted flow through the flow channel comprises a one way valve 54. During the compression stroke, the one way valve 54 will be completely closed and will therefore not affect operation. However, during the extension stroke, one way valve 54 will be completely open to permit substantially unrestricted flow through opening 55 and thereby the channel 21.

The arrangement also includes a bleed orifice 58 and a needle adjuster 60 for the orifice 58. By opening the bleed orifice 58, flow through can be increased during the compression stroke.

Figure 6A:
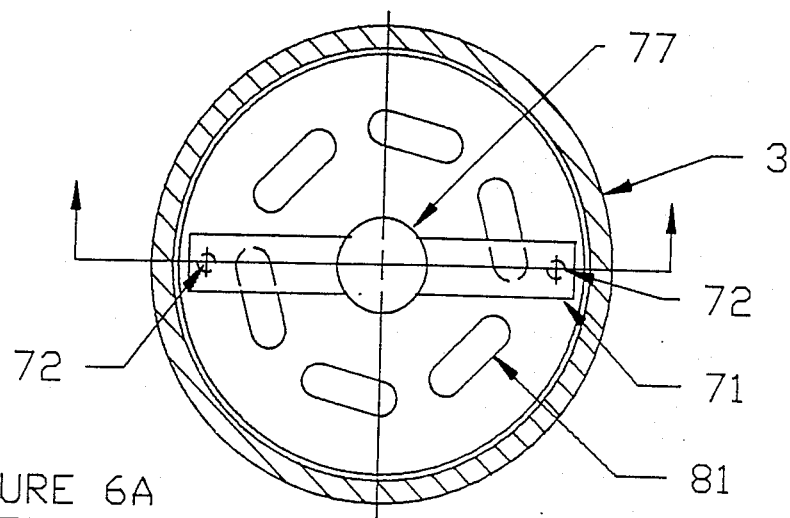
FIG. 6A is a top view and FIG. 6B is a plan view in section of the restriction means in the piston and piston rod assembly.
Figure 6B:
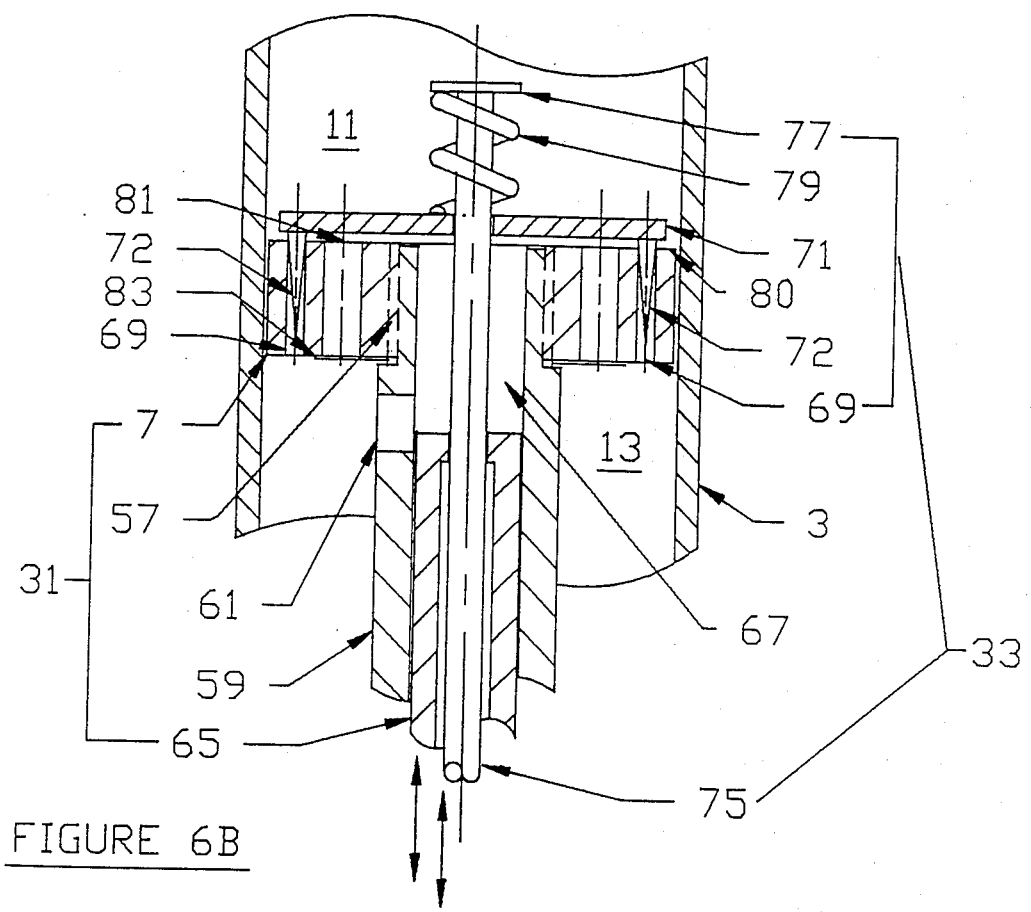

Referring now to FIG. 6, the variable low velocity restriction 31 in the piston and piston rod assembly comprises a hollow piston rod 59, concentric with piston head 7, and attached by means 57, to the piston head 7. Opening 61 extends through a wall of the piston rod 59.

Restriction 31 further includes an inner cylinder 65, concentric with piston rod 59, and slidable up and down within the piston rod 59. By sliding the cylinder 65 up and down, the size of opening 61 is decreased and increased, to thereby vary restriction 31.

A central opening 67 in piston head 7 permits the passage of fluid from chamber 13 through opening 61 through opening 67 into chamber 11 during the extension strokes.

The variable high velocity restriction 33 comprises two openings 69 extending through the piston head 7. Rectangular plate 71 mounts two protrusions 72, each one of the protrusions being aligned with and being extendable through a respective opening 69. Control rod 75 extends through the central opening 67 and includes a cap 77. Disposed between the cap 77 and the rectangular plate 71 is a spring 79. The spring forces the plate 71 against the top surface 80 of the piston 7. The tension of the spring 79 is adjustable by the control rod 75. When the force of the fluid exceeds the force of the spring, the plate 71 will be forced upwardly and the protrusions 72 will be substantially out of their respective openings 69. This condition is referred to as blow-off and the entire valve is referred to as a blow-off valve. The blow-off point is, as abovementioned, adjustable by adjustment of the rod 75.

Figure 7:
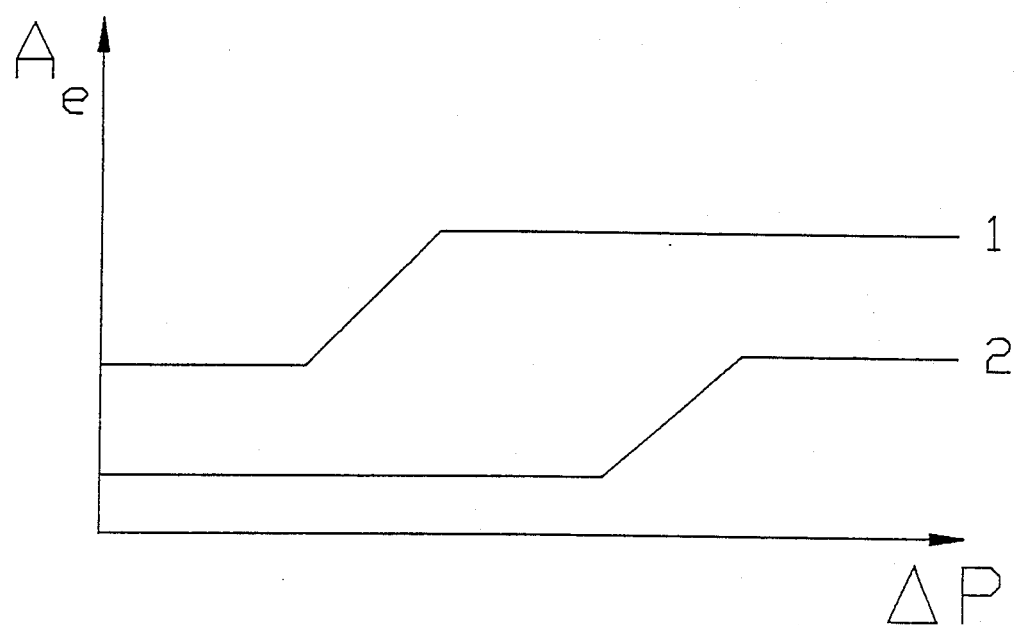
FIG. 7 is an effective area versus change in pressure graph of the FIG. 6 restriction means.

Referring to FIG. 7, the operation of the variable high velocity restriction 33 is illustrated. Once again, $A_e$ is the effective area and $\Delta P$ is the change in pressure.

In line 1, cylinder 65 is moved downwardly so that opening 61 is completely open. Rod 75 is adjusted so that there is only a small preload on the spring 79. Thus, it takes only a relatively small amount of pressure to start lifting the rectangular plate 71 upwardly. The horizontal line at the right indicates complete blow-off so that no further area can be opened.

Line 2 has opening 61 only partially opened and includes a higher preload on the spring 79. Accordingly, it takes a larger pressure to begin moving plate 71 upwardly.

The means 27 for permitting substantially unrestricted flow across the piston head comprises a series of holes or slots concentric around the piston with openings 81 and a covering flap valve 83. During the compression stroke, valve 83 will be forced away from opening 81 to permit substantially unrestricted flow across the valve. During the extension stroke, valve 83 will completely cover opening 81 so that it has no effect during the extension stroke.

It can be quite easily seen that the novel damper means comprises a wide range of adjustment, and it will be obvious to one skilled in the art that all of the adjusting mechanisms can be made to be accessed externally. More consistent temperature distribution through the fluid is brought about by the remote location of the compression damping adjuster means relative to the extension adjuster means, and the reasons for reduction of possibility of cavitation have been discussed above. Accordingly, all of the objectives of the invention have been met.

Although a particular embodiment has been described, this was for the purpose of illustrating, but not limiting, the invention. Various modifications, which will come readily to the mind of one skilled in the art, are within the scope of the invention as defined in the appended claims.

I claim:
1. A shock absorber, comprising:
a piston and cylinder arrangement comprising a cylinder, and a piston and piston rod assembly slidably mounted in said cylinder and dividing said cylinder into a first chamber and a second chamber, said cylinder being filled with a damper-fluid;
an auxiliary tank;
a flow channel permitting flow of said damper-fluid between said cylinder and said auxiliary tank;
wherein, during each compression stroke of said piston and piston rod assembly, the volume of said first chamber is decreased and the volume of said second chamber is increased; and
during each extension stroke of said piston and piston cylinder arrangement, the volume of said first chamber is increased and the volume of said second chamber is decreased;
and including:
a first restriction means associated with said piston and piston rod assembly and substantially controlling the low velocity flow of said damper-fluid during each said extenstion stroke, and a second restriction means associatd with said piston and piston rod assembly substantially controlling high velocity flow of said damper-fluid during each said extension stroke; and
a third restriction means in said flow channel substantially controlling the low velocity flow of said damper-fluid during each said compression stroke and a fourth restriction means in said flow channel substantially controlling the high velocity flow of said damper-fluid during each said compression stroke;
and further including first means permitting subtantially unrestricted flow of said damper-fluid through said piston and piston rod assembly during each said compression stroke, and a second means permitting substantially unrestricted flow of said damper-fluid through said flow channel during each said extension stroke;
said piston and piston rod assembly comprising a truncated cylindrical piston head having a top surface and a bottom surface, a central opening extending through said piston head, said piston rod comprising a hollow piston rod, an inner cylinder slidably mounted in said hollow piston rod, said inner cylinder being concentric with said piston head, an opening in the side wall of said hollow piston rod;
wherein, said first restriction means comprises said opening in said side wall, said first restriction being variable by the inner cylinder linearly sliding up and down in said hollow piston rod to thereby adjust the size of said opening in said side wall;
said second restriction means comprising a blow off valve;
said second restriction means further comprising two openings extending through said piston head from the top surface to the bottom surface thereof;
a plate member comprising said blow off valve and including a central opening and two protrusions, each protrusion being mounted to be aligned with and to extend into a respective opening;
said plate member being mounted over the top surface of said piston head;
an adjustment rod extending through said central opening and said inner cylinder, and being concentric to said inner cylinder, and including a cap at the top end thereof;
a spring between said cap and said plate member, the tension of said spring being adjustable by said adjustment rod whereby said second restriction means is also variable.
2. A damper means as defined in claim 1 wherein said first means permitting substantially unrestricted flow of said damper-fluid through said piston and piston rod assembly during each said compression stroke comprises a series of openings around said piston head and extending through said piston head from the bottom surface to the top surface thereof; and
flap valves disposed adjacent said openings on the bottom surface of said piston head.
3. A shock absorber, comprising:
a piston and cylinder arrangement comprising a cylinder, and a piston and piston rod assembly slidably mounted in said cylinder and dividing said cylinder into a first chamber and a second chamber, said cylinder being filled with a damper-fluid;
an auxiliary tank;
a flow channel permitting flow of said damper-fluid between said cylinder and said auxiliary tank;

wherein, during each compression stroke of said piston and piston rod assembly, the volume of said first chamber is decreased and the volume of said second chamber is increased; and during each extension stroke of said piston and piston cylinder arrangement, the volume of said first chamber is increased and the volume of said second chamber is decreased;

and including:

a first restriction means associated with said piston and piston rod assembly and substantially controlling the low velocity flow of said damper-fluid during each said extension stroke, and a second restriction means associatd with said piston and piston rod assembly substantially controlling high velocity flow of said damper-fluid during each said extension stroke; and a third restriction means in said flow channel substantially controlling the low velocity flow of said damper-fluid during said compression stroke and a fourth restriction means in said flow channel substantially controlling the high velocity flow of said damper-fluid during each said compression stroke;

said third restriction means comprising;

a first orifice in said flow channel between said cylinder and said auxiliary tank;

a first means for adjusting said first orifice;

a first reed means disposed over said first orifice;

first means for adjusting the stiffness of said first reed;

said fourth restriction means comprising;

a parallel second orifice in said flow channel between said cylinder and said auxiliary tank;

a second reed means disposed over said second orifice;

second means for adjusting the stiffness of said second reed.

4. A damper means as defined in claim 3 and further including a second means for adjusting said second orifice.

5. A damper means as defined in claim 4 wherein said third restriction means and said fourth restriction means and said second means permitting substantially unrestricted flow of said damper-fluid through said flow channel during each said extension stroke comprises an enclosure disposed in said flow channel;

a first opening in said enclosure connected to said cylinder;

a second opening in said enclosure connected to said auxiliary tank.

6. A damper means as defined in claim 5 wherein said first reed means is relatively flexible and wherein said second reed means is relatively rigid.

7. A damper means as defined in claim 6 wherein said second means permitting substantially unrestricted flow of said damper-fluid through said flow channel during said extension strokes comprises a one way valve between said first opening and said second opening and mounted such that said valve is fully open during said extension strokes and is fully closed during said compression strokes.

* * * * *